United States Patent [19]

Hafele

[11] 4,280,630
[45] Jul. 28, 1981

[54] CONTAINER WITH HANDLE

[75] Inventor: Robert X. Hafele, Baton Rouge, La.

[73] Assignee: Ethyl Corporation, Richmond, Va.

[21] Appl. No.: 75,590

[22] Filed: Sep. 14, 1979

[51] Int. Cl.³ .............................................. B65D 1/02
[52] U.S. Cl. ............................... 215/100 A; 215/1 C;
264/532; 264/537; 425/525
[58] Field of Search ......................... 215/100 A, 1 C;
425/525; 264/523, 532, 535, 537

[56] References Cited

U.S. PATENT DOCUMENTS

| 3,029,471 | 4/1962 | Adams . | |
|---|---|---|---|
| 3,159,697 | 12/1964 | Tocci | 215/1 C UX |
| 3,371,807 | 3/1968 | Clouser | 215/100 A X |
| 3,941,542 | 3/1976 | Uhlig | 425/525 X |
| 3,944,642 | 3/1976 | Uhlig . | |
| 3,983,199 | 9/1976 | Uhlig . | |

FOREIGN PATENT DOCUMENTS 154343 11/1953 Australia ................... 425/525
1192475 4/1959 France .

*Primary Examiner*—Donald F. Norton
*Attorney, Agent, or Firm*—Donald L. Johnson; John F. Sieberth; Edgar E. Spielman, Jr.

[57] ABSTRACT

An improved hollow plastic container which is blow molded from an injection molded preform is disclosed. The container has an integral injection molded handle which handle is attached at only one point to the container. The injection molded handle is formed contemporaneously with the formation of the injection molded preform.

10 Claims, 10 Drawing Figures

CONTAINER WITH HANDLE

BACKGROUND OF THE INVENTION

The popularity of blow molded thermoplastic handleware has grown in recent years as consumers begin to appreciate the ease of use and the non-breakable characteristics of such containers. Handled containers are especially popular in the larger sizes, i.e. containers having a capacity of one quart or greater. Exemplary of products which are often packaged in handleware are starch, bleach, detergent, milk, distilled water, etc.

In the past a class of blow molding machines known as the "inject, extrude and blow" machines have been adapted to blow mold handled containers of large size. In these machines the neck, or finish, of the container is injection molded in an injection mold superimposed on an annular orifice. After the mold is filled from the orifice, the mold is moved away from the orifice as the tube integral with the material filling the mold is extruded through the orifice. The blow mold is then closed between the tube and the neck mold of the orifice pinching the tube shut near the orifice. Blow air is then injected through the neck mold into the tube, and the tube is simply inflated to the configuration of the blow mold. In early attempts to adopt such injection, extrude and blow machines for the manufacture of handled containers, it was found nearly impossible to extrude a tube having both an integral injection finish and a diameter sufficient to provide material properly located in the parison to be pinched shut by the blow mold to form an integral handle upon blowing. This early attempt at forming handleware resulted in the production of much waste material, i.e. flash, which was principally found on the interior and exterior of the handle. Other problems were also recognized, such as uneven material distribution and pin holes in the handle.

Further refinements were made on the inject, extrude and blow process which were claimed to reduce the amount of flash produced and to also provide a container having uniform material distribution. By reducing the amount of flash which must be trimmed from the container, leaks in the container are said to be avoided. Exemplary of these newer machines is the one disclosed in U.S. Pat. No. 3,944,642.

In the newer version the tubular parison integral with the injection molded finish portion of the container is formed in a conventional manner as set forth in U.S. Pat. No. 3,983,199. The preform is then preblown in an intermediate blow mold which has a similar but smaller shape than the final blow mold. The preblow preform has a portion which is of a configuration such that the preform portion which will form the handle will be encompassed within the handle defining portions of the final blow mold. Once the preblown preform is positioned within the final blow mold the preform is blown to its final shape. Even though this machine and process produces a handled container which is free of external flash, there is still produced flash which is in the interior of the handle, i.e. in the space encompassed between the handle and the container.

Handleware may be produced without concurrent production of flash by the apparatus disclosed in U.S. Pat. No. 3,029,471. This apparatus injection forms the handle followed by formation of an extruded tube which is integral with the handle. The tube is extruded to a sufficient length to fill the axial length of an adjacent split blow mold. The split blow mold is closed to capture that portion of the extruded tube beneath the injection molded handle so that that portion of the tube may be inflated to form the container. Since the apparatus passes the molten thermoplastic material through a single orifice for both the injection and extrusion steps, a highly complex timing and mechanical system must be used. Furthermore, temperature control of the injection finish with respect to the extruded tube will be difficult to handle at best.

Therefore it is an object of this invention to provide a container which can be produced with relatively simple equipment and process requirements but without the concurrent production of flash. It is also an object of this invention to provide unique handleware in which the handle is attached at only one point to the main container body.

THE INVENTION

This invetion relates to an improvement in hollow thermoplastic containers blow molded from an injection molded preform. The container is closed at one end and terminates at the other end in an open mouth. The improvement comprises the container having an injection molded handle integral with the container, the handle being attached at only one point to the container and being formed contemporaneously with the formation of the preform. The handle can have various configurations depending upon the appearance sought to be achieved by the designer of the container. A particularly effective handle is one in which the handle has a horizontal portion integral at one end to the container and integral at its other end to a vertical portion. To provide strength it has been found preferable that the handle have a cross section which is designed to provide the highest degree of strength. For example, the handle could have an I-beam appearance when viewed in cross-section—this cross-sectional configuration being widely recognized in the art as providing great strength.

The containers of this invention can be made of any suitable thermoplastic material recognized by the art as useful in container manufacture. Exemplary of such materials are polyethylene terephthalate, polypropylene, polyvinyl chloride, etc.

Since the handle of the container of this invention is produced in its entirety contemporaneously with the formation of the preform, there will be no production of flash when the preform is blow molded to form the main container body. Thus great savings are realized by the bottle manufacturer as there is no need for flash removing steps subsequent to the blow molding step.

These and other features contributing to satisfaction in use and economy in manufacture will be more fully understood from the following description of a preferred embodiment of the invention when taken in connection with the accompanying drawings in which identical numerals refer to identical parts and in which.

Figure 1:
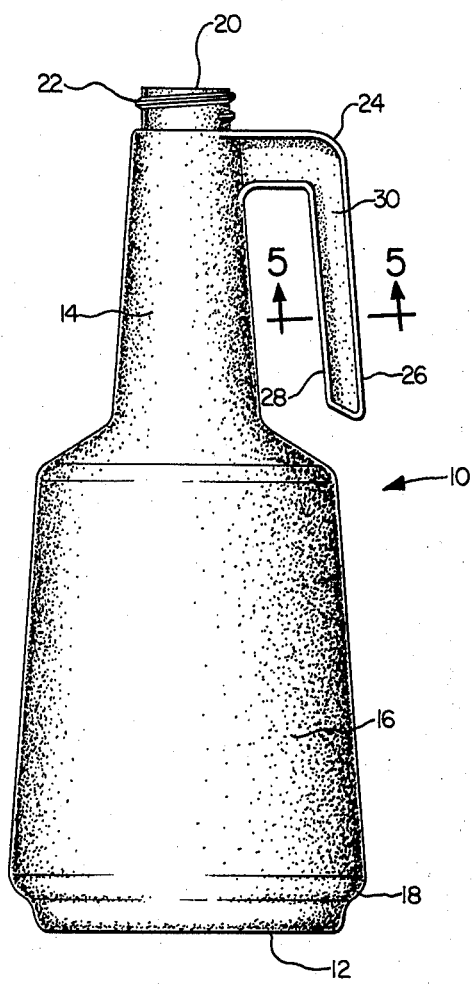
FIG. 1 is a front elevational view of a container of this invention.
Figure 3:
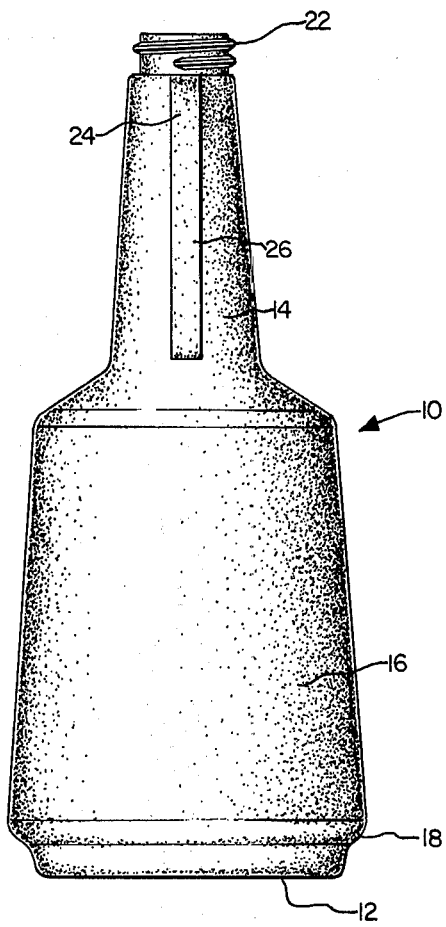
FIG. 3 is a right side elevational view of the container shown in FIG. 1.

Referring now to FIGS. 1–5, there is shown a container of this invention generally designated by the numeral 10, having an injection-formed handle 24 which is integral with container 10 and attached at one point at the upper end of container neck 14. Immediately above handle 24 there are helical threads 22 which are adapted to cooperate with helical threads on a closure for container 10. The closure is not shown in the drawings. At the lower end of neck 14 is body portion 16 which is closed off at its lower end by bottom wall 12. Annular step out wall 18 is provided to give container 10 a pleasant appearance.

Figure 5:
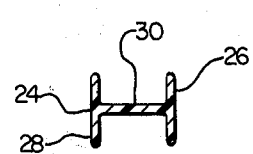
FIG. 5 is a sectional view taken through section lines 5—5 in FIG. 1.
Figure 2:
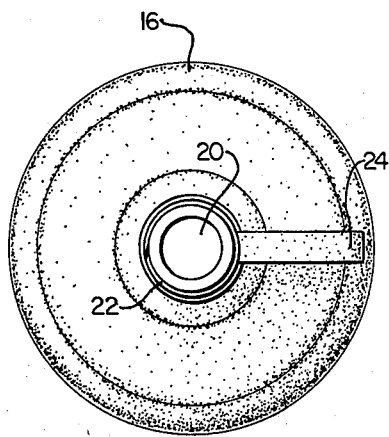
FIG. 2 is a top plan view of the container shown in FIG. 1.
Figure 4:
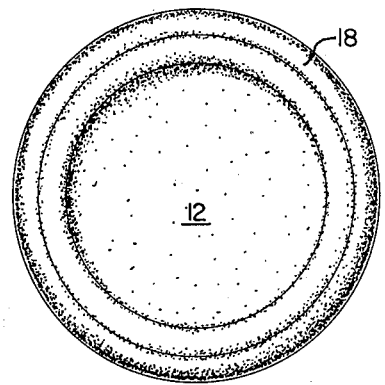
FIG. 4 is a bottom plan view of the container shown in FIG. 1.
Figure 7:
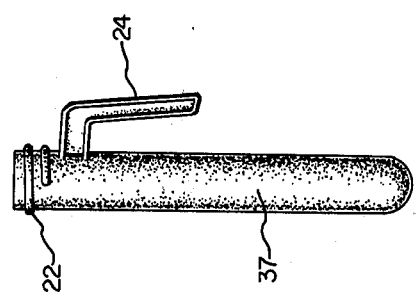
FIG. 7 is a side elevational view of a preform utilized to produce the container shown in FIG. 1.

Handle 24, for the embodiment shown, has an I-beam configuration in cross-section as shown in FIG. 5. Other configurations may be utilized provided that the configuration gives handle 24 sufficient strength to remain rigid under the weight of the contents of container 10. When the I-beam configuration is utilized, handle 24 has a pair of parallel walls 28 and 26. Walls 28 and 26 are joined one to the other by vertical wall 33.

Figure 6:
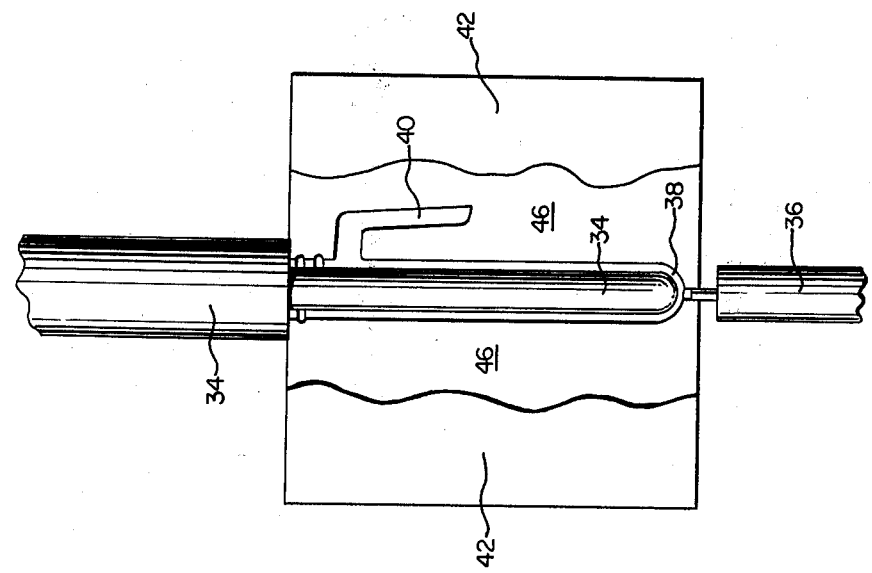
FIG. 6 is a partially broken away side elevational view of an injection mold utilized to produce the preform for the container shown in FIG. 1.

To produce the container of this invention, a preform with handle 24 is first produced by injection molding. Handle 24 is produced full size while the main preform body will be substantially smaller than container 10. In FIG. 6 an injection molding apparatus, generally designated by the numeral 41, is shown. Apparatus 41 has a pair of split injection molds 42 and 46. Each of the split mode has a cavity which in combination with preform pin 34 will provide a recess 38 and a handle cavity 40 which when filled with plastic will yield hollow preform 37. To introduce thermoplastic material to injection form preform 37 there is provided injection nozzle 36 which fits within an injection nozzle cavity 35 through which the thermoplastic material can be injected to fill recess 38 and handle cavity 40. Once the thermoplastic material has been injected into the recess in the handle cavity, cooling fluid is passed through split injection molds 42 and 46 to chill the injected plastic. Preform pin 34 is then withdrawn and the split mold is opened so that the split preform 37 can be removed therefrom.

Figure 9:
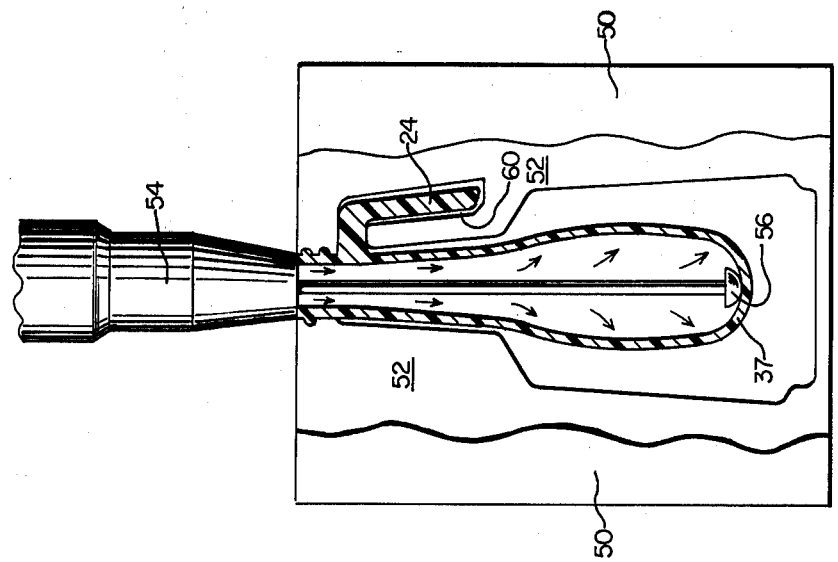
FIGS. 8–10 are partially broken away side elevational views of a blow mold sequentially showing the blowing of the preform to produce the container shown in FIG. 1.
Figure 8:
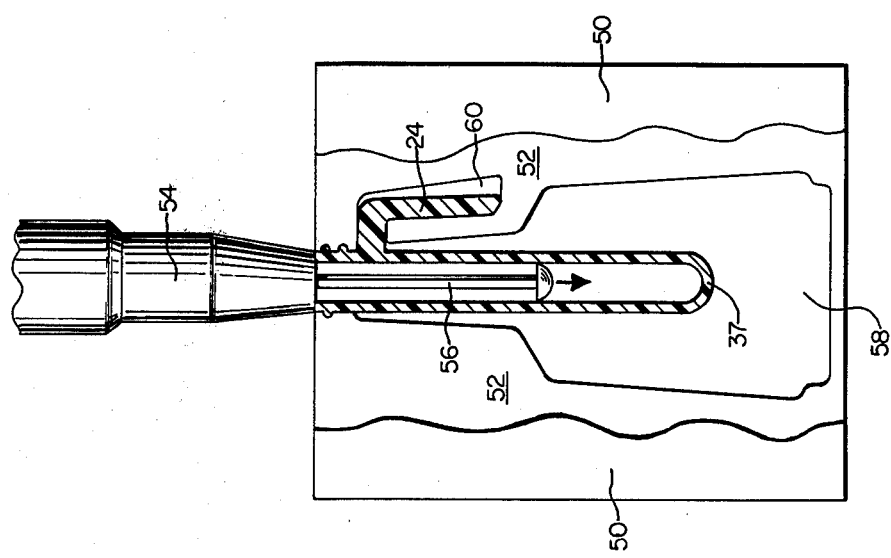
Figure 10:
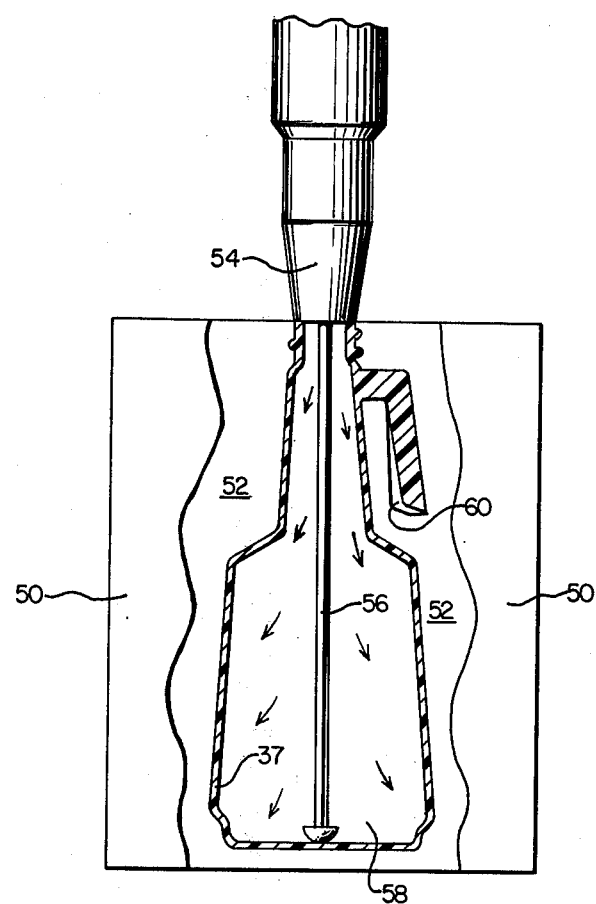

Preform 37 is positioned at a blow molding apparatus so that it may be inflated to yield the final container of this invention. Blow molding apparatus 51 has a pair of split blow molds 50 and 52. Each of these split molds has a complementary cavity which together form blow mold cavity 58. As can be seen in FIG. 8, preform 37 is captured within cavity 58 with handle 24 being captured within blow mold handle cavity 60. Blow mold handle cavity 60 is larger than handle 24 to allow for movement of handle 24 as preform 37 is inflated. This movement of handle 24 is shown in FIGS. 8, 9 and 10. In FIG. 8 blow pin 54 has been lowered to the neck of preform 37. For the embodiment shown in the drawings, the preform will be axially and radially stretched to yield a biaxially oriented container. To achieve biaxial orientation preform 37 will also have to be at its biaxial orientation temperature, which temperatures are well known to those skilled in the art for the various thermoplastic materials which may be utilized to produce containers. Push rod 56 begins its descent until it makes contact with the bottom of preform 37. Air is then introduced into the preform to being inflation thereof while push rod 56 continues its downward descent. This step is shown in FIG. 9, as is also shown the movement of handle 24 within blow mold handle cavity 60. In FIG. 10 preform 37 has been blown the full extent of blow mold cavity 58 and stretch rod 56 has reached its downwardmost extent. Note that handle 24 has moved across blow mold handle cavity 60. Push rod 56 can now be retracted as cooling fluids are passed through blow molds 50 and 52 to cool the blown container. After cooling, the mold halves are opened and the container is removed therefrom. The movement of handle 24 within blow mold handle cavity 60 is due to the inflation of neck 14 which has a diameter larger than the diameter of preform 37. In those instances where preform 37 has a diameter equal to the diameter of neck 14 and there is no movement of the neck wall to which handle 24 is attached, there will be no need for dimensioning blow mold cavity 60 larger than handle 24.

In those cases where no biaxial orientation container is desired, push rod 56 will not be used and preform 37 will be simply inflated according to conventional blow molding techniques.

What is claimed is:

1. In a hollow thermoplastic container, blow molded from an injection molded preform, said container being closed at one end and terminating at the other end in an open mouth, the improvement comprising: said container having a blow molded neck portion and additionally having an injection molded handle integral with said container, said handle being attached at only one point to said container at said blow molded neck portion and being formed contemporaneously with the formation of said preform.

2. The container of claim 1 wherein said handle has a horizontal portion integral at one end to said container and a vertical portion integral to the other end of said horizontal portion.

3. The container of claim 2 wherein said handle comprises two parallel walls joined one to the other by a vertical third wall.

4. The container of claim 3 wherein said container is made of polyethylene terephthalate.

5. The container of claim 3 wherein said container is made of polypropylene.

6. The container of claim 3 wherein said container is made of polyvinyl chloride.

7. The container of claim 1 wherein said handle comprises two parallel walls joined one to the other by a vertical third wall.

8. The container of claim 1 wherein said container is made of polyethylene terephthalate.

9. The container of claim 1 wherein said container is made of polypropylene.

10. The container of claim 1 wherein said container is made of polyvinyl chloride.

* * * * *